Dec. 19, 1967     U. MERTEN ET AL     3,359,136
RECHARGEABLE ENERGY CONVERSION SYSTEM
Filed Jan. 14, 1966     2 Sheets-Sheet 1
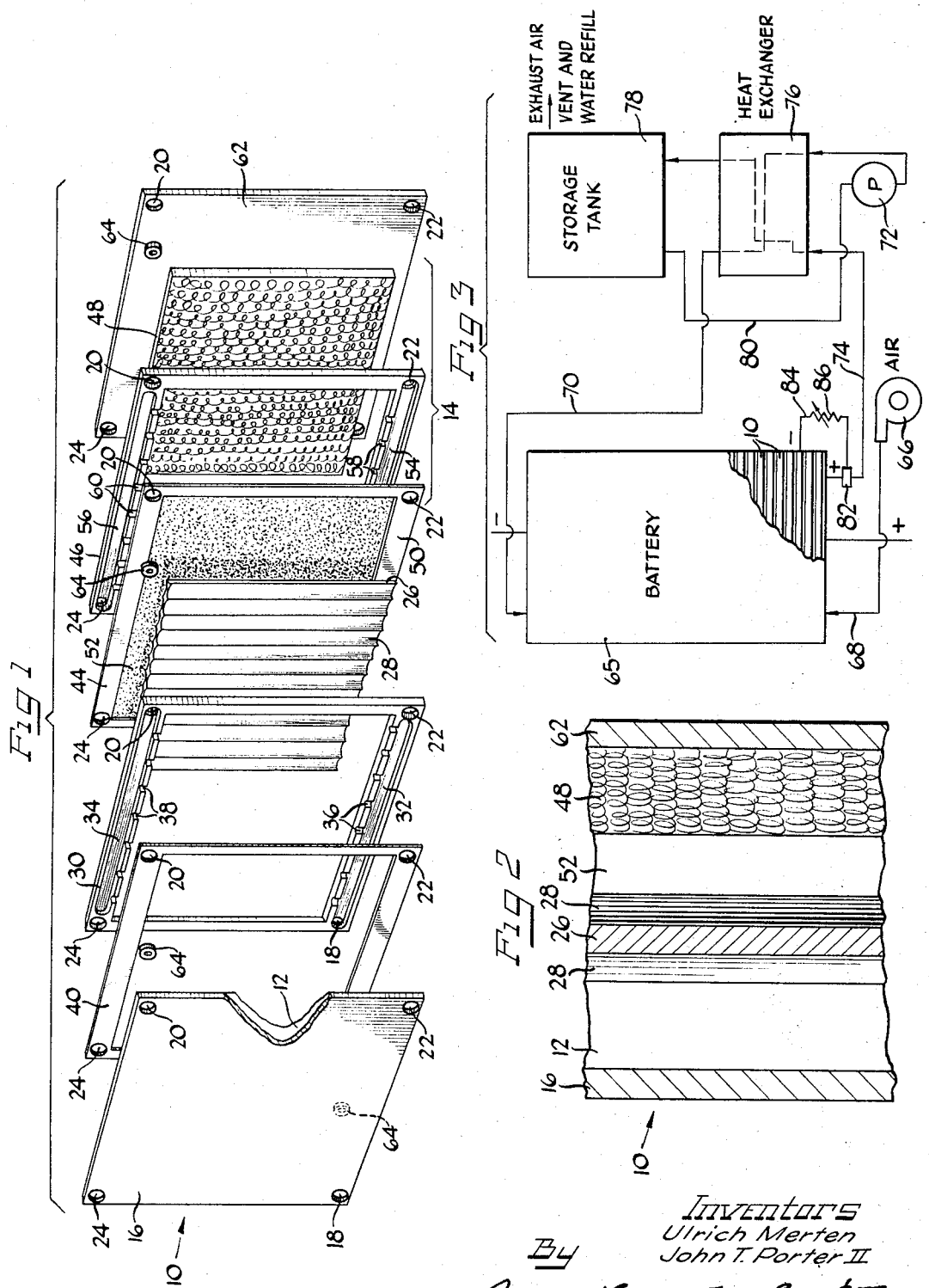
Inventors
Ulrich Merten
John T. Porter II
By
Anderson, Luedeka, Fitch, Even & Tabin
Attys

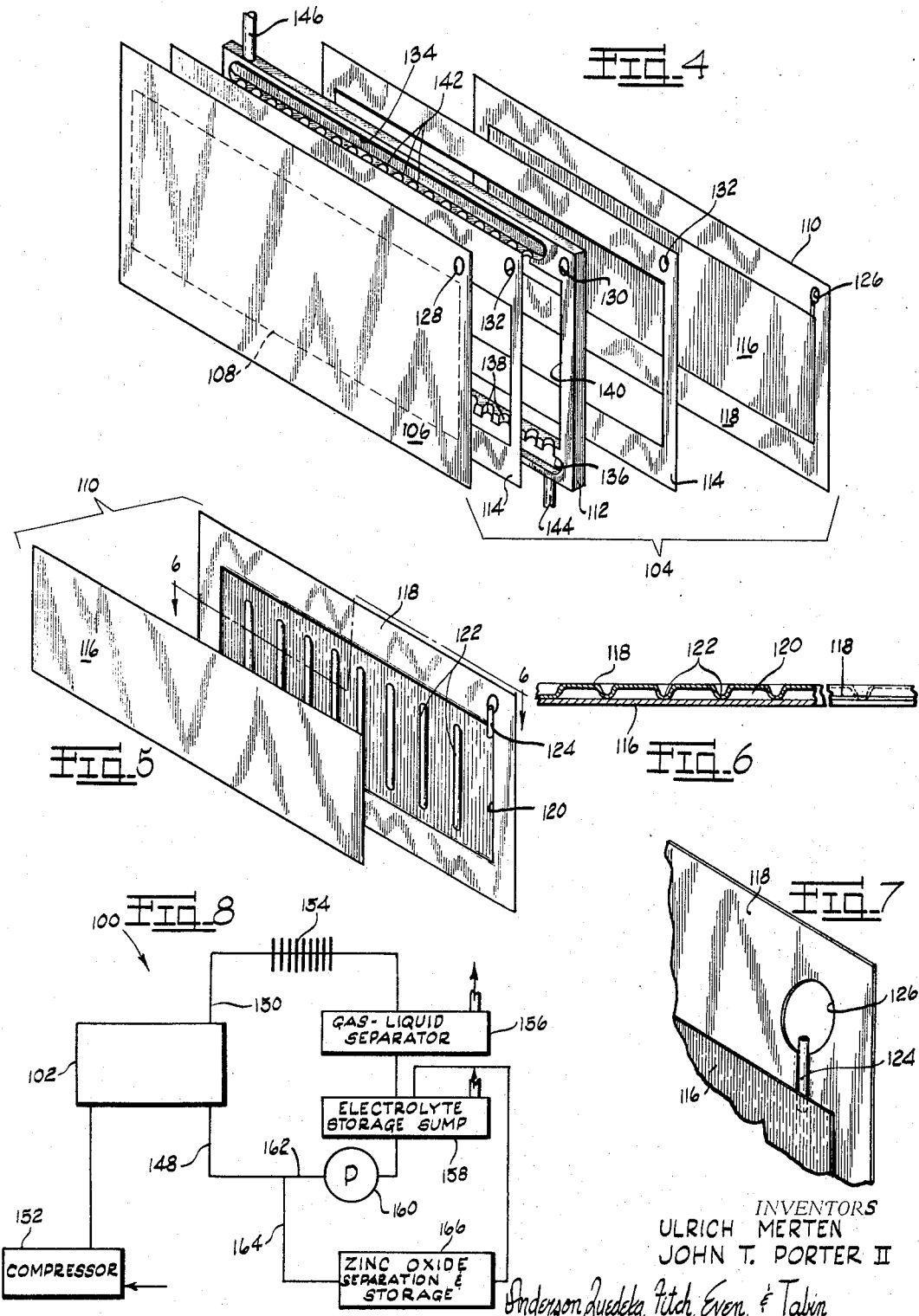

United States Patent Office 3,359,136
Patented Dec. 19, 1967

3,359,136
RECHARGEABLE ENERGY CONVERSION
SYSTEM
Ulrich Merten, Solana Beach, and John T. Porter II, Del
Mar, Calif., assignors to General Dynamics Corporation, New York, N.Y., a corporation of Delaware
Filed Jan. 14, 1966, Ser. No. 525,815
14 Claims. (Cl. 136—86)

This application is a continuation-in-part of Ser. No. 259,016, filed Feb. 18, 1963, now abandoned.

This invention relates to a battery and more specifically to an improved storage battery.

One general class of conventional storage batteries employ a lead-lead dioxide electrochemical couple and are commonly referred to as lead-acid batteries. Such storage batteries have found wide acceptance, particularly for starting in automobiles, but are not particularly desirable for use as a motive power source, as for traction purposes, where space and weight limitations are present. In this connection, lead-acid storage batteries have a low energy density, i.e., power output per pound of battery weight. A conventional lead-acid storage battery has a theoretical maximum energy density of 76 watt hours per pound of reactants and produces 5 to 20 watt hours per pound of total battery weight in practice. The low power output per unit weight is primarily due to the high molecular weight of the reactants and the rather large excesses of anodic and cathodic reactants required, since all of the electrodes cannot be completely consumed during the discharge of the battery. The lead-acid battery's reversibility is dependent upon the physical position of the reactants and decomposition products and requires the use of highly porous electrode plates to provide sufficient surface for the solid-solid reactions to take place.

It is a principal object of the present invention to provide a storage battery which has a high energy density. An additional object is to provide a storage battery which is easily and conveniently recharged.

A further object is to provide a storage battery which is convenient to use, is economical to manufacture and which provides trouble free operation during discharging and recharging.

These and other objects of the invention are more particularly set forth in the following detailed description and in the accompanying drawings of which:

FIGURE 1 is an exploded perspective view of a specific embodiment of a cell for a storage battery;

FIGURE 2 is an enlarged fragmentary sectional view of the cell of FIGURE 1;

FIGURE 3 is a schematic flow diagram of a rechargeable energy conversion system including an assembled battery employing a number of the individual cells shown in FIGURES 1 and 2;

FIGURE 4 is an exploded perspective view of an alternative embodiment of an electrochemical cell for a storage battery;

FIGURE 5 is an exploded perspective view of one of the elements of FIGURE 4;

FIGURE 6 is a sectional view taken along line 6—6 of FIGURE 5 showing the element in assembled condition;

FIGURE 7 is an enlarged fragmentary view of a portion of FIGURE 4; and

FIGURE 8 is a schematic flow diagram of a rechargeable energy conversion system including an assembled battery employing a number of the electrochemical cells shown in FIGURES 4 to 7.

Generally, as shown in the drawings, a cell 10 made according to the teaching of the present invention comprises an anode 12 composed of zinc, and a cathode 14 spaced from the anode and having oxygen passed therethrough. An aqueous solution of a caustic electrolyte is circulated between the anode 12 and cathode 14.

The zinc-oxygen electrochemical couple thus formed has a high theoretical capacity and a high utilization factor for the anodic and cathodic reactants. Zinc is the lightest, highly electropositive, solid element which can be plated in an undiluted state from an aqueous solution. Oxygen is light in weight and is also available from the atmosphere, thus making it unique among the possible gaseous reactants in that it does not require heavy and cumbersome storage equipment. The theoretical potential of the reaction $$Zn + \tfrac{1}{2}O_2 \rightarrow ZnO$$

is 1.65 volts and an actual open circuit voltage of 1.4 volts is obtainable.

To aid in describing the specific battery shown, the various components are referred to and described from left to right as shown in FIGURES 1 and 2. The battery 10 includes an anode backing plate 16 to which the zinc anode 12 is attached, as by electrodeposition. This plate may be of any suitable shape and, in its illustrated form, is square. The anode backing plate 16 is constructed from an electroconductive material that is inert to the caustic electrolyte, such as nickel, iron or mild steel, with iron or mild steel being preferred. The backing plate 16 contains passageways 18 and 20 in the lower left and upper right corners thereof for the passage of an aqueous solution of a caustic electrolyte such as potassium hydroxide through the cell, as more fully described hereinafter. Gaskets 64 of insulating material, such as plastic, are disposed in the electrolyte passageways. Passageways 22 and 24 are provided in the lower right and upper left corners for the passage of an oxygen-containing gas such as air as more fully described hereinafter.

The zinc anode 12 is separated from the oxygen cathode 14 by a porous inner separator 26 of suitable size and shape which, as illustrated, is generally square. The separator 26 is constructed, for example, from a porous plastic or from another non-conducting porous material that is inert to the caustic electrolyte. The illustrated separator 26 is formed with a fluted surface 28 on each side thereof. The fluted surface on the side toward the anode backing plate 16 allows for maximum volume of zinc deposition on the facing surface, and the fluted surface toward the oxygen cathode assures free passage of oxygen-containing gas into the electrolyte. The use of the porous inert separators 26 in each electrochemical cell enables the cell to be assembled by clamping a multicell unit together using end plates and suitable clamping screws (not shown). The location of the separator 26 provides positive protection against accidental contact occurring between the anode 12 and the cathode 14 due to the operating pressure of the oxygen-containing gas causing bowing of either of the electrodes in an electrochemical cell.

As shown in FIGURE 1, the separator is rimmed by a manifold gasket 30 of a non-conducting material which is inert to the caustic electrolyte, such as polyethylene or polypropylene. The lower and upper horizontally extending portions of the manifold gasket 30 are provided with horizontally extending slots 32 and 34 therein which act as manifolds for a plurality of vertically extending weep notches 36 and 38 which extend between the slots 32 and 34 and the flutes in the surface of the separator 26.

A gasket 40 is interposed between the manifold gasket 30 and the backing plate 16 to cover the slots 32 and 34 and weep notches, and thereby prevent the leakage of the electrolyte therefrom. The gasket 40 is constructed from any suitable non-conducting material, e.g. plastics such as polyethylene or polypropylene, or other materials which are inert to the caustic electrolyte.

In the illustrated embodiment the sealing gasket 40 is provided with passageways 18, 20, 22 and 24 in the corners thereof which cooperate with the passageways 18, 20, 22 and 24 in the anode backing plate 16 for the passage of electrolyte and oxygen-containing gas through the sealing gasket. The ends of the slots 32 and 34 in the manifold gasket 30 are extended to include areas which cooperate with the electrolyte passageways in the sealing gasket for passage of electrolyte into and out of the slots 32 and 34. Passageways 22 and 24 are provided in the lower right and upper left corners of the gasket for passage of air therethrough.

As shown in FIGURES 1 and 2, the cathode 14 is disposed to the right of the gasket 30 and includes a porous member 44 having a central portion 52 which is fabricated from an electroconducting material which is inert to the electrolyte, such as powdered nickel. Additionally, means well known in the art may be employed to improve the performance of the air electrode, for example palladium may be plated thereon to act as a catalyst. The member 44 is made sufficiently porous to permit an oxygen-containing gas to diffuse therethrough, and a finely divided powdered material is preferably employed for the fabrication of the cathode to provide the surface area required for maximum output. Particularly when air is used as the oxygen-containing gas, the air may be permitted to pass through the porous cathode and bubble into the electrolyte. By bubbling air through the porous cathode, an ample supply of oxygen is assured to the reactive surfaces of the cathode because the removal of the nitrogen component of the air is facilitated. The gas which enters the electrolyte stream, and which is carried away by the circulating liquid electrolyte, is extremely rich in nitrogen because the oxygen has been depleted via the cathode reaction, which provides one-half of the total electrochemical reaction in the storage battery.

The porous member 44 is provided with an integral solid rim 50 of a material which is inert to the electrolyte and is electroconductive such as nickel. The solid rim 50 serves as one side of the manifold in the gasket 46. Passageways 18, 20, 22 and 24 are provided in the corners of the rim 50 and cooperate with the passageways in the other members to permit passage of gas and electrolyte therethrough. The rim 50 also covers the slots 54 and 56 and the weep notches 58 and 60 to prevent the escape of gas therefrom.

The gas manifold gasket 46, which is disposed to the right of the cathode 44 (FIG. 1) is made generally similar to the gasket 30 and is constructed from a similar non-conducting material. In this connection, the gasket 46 is provided with horizontally extending slots 54 and 56 in its lower and upper rims which are connected by a plurality of vertically extending weep notches 58 and 60 with the interior of the plenum chamber space defined by the gasket. A filler 48 is disposed in the space and is constructed from a porous electroconducting material, such as stainless steel wool or nickel-coated plastic fibers. The gasket 46 seats up against the solid rim, the rim thereby serving to cover one side of the manifolds and the weep notches.

As shown in FIGURE 1, the gas manifold gasket 46 is formed with passageways 18 and 20 in its lower left and upper right corners thereof which cooperate with the previously described passageways 18 and 20 to provide means for passing electrolyte through the cell. The slots 54 and 56 in the gasket 46 are extended to communicate with the gas passageways 22 and 24 to permit the flow of gas therebetween.

A backing plate 62 of inert, electroconducting material, such as iron or mild steel, is disposed to the right of the gas manifold gasket 46. The backing plate 62 may serve as an anode backing plate for a subsequent cell (not shown) in a series arrangement of cells. The backing plate 62 is provided with passageways 18, 20, 22 and 24 in its respective corners for passage of electrolyte and air in the subsequent cell which cooperate with the previously described passageways 18, 20, 22 and 24. The inert washer-like gaskets 64, disposed within the electrolyte passageways 18 and 20, shield the anode backing plates 62 from direct contact with the electrolyte at these points and reduce the diameter of the passageways between adjacent cells. This arrangement reduces losses within a battery via self-discharge.

There is shown in FIGURE 3 a battery 65 employing a plurality of the individual cells 10 of FIGURE 1 which are clamped together by suitable means (not shown) such as a plate and frame press. Any number of the individual cells 10 can be employed within the battery 65 and the cells may be connected in diverse series and parallel combinations according to the power output desired from the battery. In this connection, when the desired number of cells are provided in series a non-conductive filler is provided in the air space and the cathode rim and the backing plate on either side of the air space are made extra thick. Tabs (not shown) are added to this cathode and this backing plate for electrical connections. These adjacent sets of series cells are connected in parallel.

The arrangement of a number of cells in series electrical connection and with a common electrolyte will lead to the passage of self-discharge currents between the cells. In the embodiment of FIGURE 1, these currents are kept at acceptable levels by making the electrolyte passages through the weep holes 36 and 38 and through the washer-like gaskets 46 small and by limiting the number of cells placed in a single series arrangement. It is recognized that this reduction in size of the flow passageways is a compromise because it increases the resistance to flow and consequently the pumping requirements.

An oxygen-containing gas, such as air, is fed into the battery 65 by means of a gas blower or compressor 66 and gas line 68 and passes through the inlet gas passageways 22 and cathodes 14 of the individual cells 10. Electrolyte is supplied to the inlet electrolyte passageways 18 of the cells 10 within the battery 65 through line 70. The electrolyte is withdrawn from the battery 65 through line 74 and passes through a heat exchanger 76 and into an electrolyte storage tank 78, where it is further cooled. The electrolyte is withdrawn from the storage tank 78 through line 80 and is delivered to inlet of a pump 72. The electrolyte is pumped by pump 72 into line 70 through the heat exchanger 76 in heat exchange relationship with the electrolyte in line 74, thus providing a closed electrolyte circulation system.

In order to achieve the high energy densities which are desirable, the zinc oxide reaction products formed during the discharge of the battery preferably are removed from within the battery cell. If the reaction products are not removed from the battery cell, or at least circulated to prevent precipitation on the anode surface, it becomes necessary to employ a large amount of electrolyte to completely solubilize the zinc oxide reaction products formed, thereby greatly reducing the energy density per pound of total battery weight. However, if the electrolyte is circulated through the battery the reaction products formed can be removed from the vicinity of the anode surface, and the battery can be operated with a lesser amount of a saturated electrolyte. The circulating electrolyte picks up the zinc oxide reaction products formed within the battery cell and carries them externally of the cell where they are separated from the electrolyte solution.

In operation the caustic electrolyte enters each cell of the battery at the lower left through inlet passageway 18 and exits from the battery at the upper right through exit passageway 20 while oxygen-containing gas enters the battery at the lower right through inlet passageway 22 and a small flow exits from the cell at the upper left through exit passageway 24. By permitting a small flow of gas to exit from each cell, it is assured that there is a constant passage of gas through all portions of the region wherein the filler 48 resides. The electrolyte entering through passageway 18 passes into slot 32 within gasket 30 and passes into the space defined by the gasket 30 through the weep notches 36. The electrolyte exits from the space through the weep notches 38 into slot 34 and is withdrawn from the cell through exit passageway 20.

In a similar manner the oxygen-containing gas enters the battery cell through inlet passageway 22 in backing plate 62 and passes into slot 54 in the gasket 46 and through the weep notches 58 into the space defined by the gasket 46. A portion of the gas delivered into the space passes through the porous surface 52. The presence of oxygen-containing gas in contact with the electrolyte within the porous structure 52 establishes an electrolytic cell between the surface 52 and the zinc anode 12. The remaining gas that does not pass through the porous surface 52 passes through weep notches 56 into slot 60 and leaves the battery cell at the upper left through exit passageway 24. The portions of the gas passing through the porous surface 52 that are not consumed during operation of the electrolytic cell pass out of the battery cell along with the electrolyte through the previously described electrolyte exit passageway 20.

The aqueous caustic electrolyte which is warmed during its passage through the battery solubilizes the zinc oxide reaction products within the battery and passes out of the battery through line 74 through heat exchanger 76, in heat exchange relationship with the electrolyte in line 70, and passes into the storage tank 78. The electrolyte carrying the reaction products is cooled in the heat exchanger 76. In order to enhance the separation of the zinc oxide reaction products within the storage tank 78, the tank is filled with a fibrous material (not shown) such as aluminum silicate fibers, which provide a high surface area upon which the zinc oxide may be accumulated. The cool electrolyte is withdrawn from storage tank 78 and is recirculated through the battery where more zinc oxide reaction products are picked up and withdrawn from the battery.

In operation, particularly at temperatures higher than room temperature, water may evaporate during operation of the battery. In order to replenish the evaporated water, the storage tank may be suitably connected to a water refill line (not shown). The battery is preferably sized so as to require replenishing of the water only at the end of each charge-discharge cycle. Additionally, the storage tank 78 also contains a suitable exhaust outlet for the unreacted portions of the oxygen-containing gas which is picked up by the circulating electrolyte while passing through the cells.

To recharge the battery, the zinc is electro-deposited upon the backing plate by applying a direct current voltage to the cells such that current densities up to several hundred milliamperes per square centimeter are passed through the cells. Metallic zinc is plated out of the circulating electrolyte stream onto the backing plates, and the partially depleted electrolyte picks up additional zinc oxide from the storage tank 78 before it is reciculated through the cells.

The zinc may also be electrodeposited to recharge the battery by an alternating current superimposed on a direct current. The alternating current wave form is such as to cause a small reverse current to flow through the battery during one-half of each cycle of the alternating current. The resulting deposited zinc has a moderately coarse crystalline structure, but is relatively dense and is more adherent to the backing plate than is the zinc electrodeposited by the direct current method. For this reason, the alternating current charging of the battery is preferable when larger capacities are desired.

In some instances, however, a portion of the anodic zinc metal may become detached from the anode during either the charging or discharging of the battery, regardless of the particular charging technique employed. The particles of zinc metal that become detached are only very slowly soluble in the circulating caustic electrolyte and may be continuously recirculated through the system as a suspension in the electrolyte, reducing the capacity of the battery. In order to prevent the buildup of anodic zinc metal particles in the circulating electrolyte, means for solubilizing the detached anodic metal particles may be placed in the electrolyte line.

As shown in FIGURE 3, the particular means employed includes an electroconducting filter or plug 82 electrically connected through an external electric conductor 84 to a cathode nearest the exit conduit 74 of the battery 65. The filter or plug 82 is made of a metal which is inert to the caustic electrolyte such as nickel, platinum, etc. A filter made in the form of a foraminous screen of the order of 50 mesh or a coarse metal fiber plug may be employed. The electrolyte circulating through the electrolyte flow line 74 establishes an electrolytic path between the cathode of the battery 65 and the electroconducting filter 82, resulting in the formation of an electrolytic cell between the cathode of the battery cell and any metallic zinc particles that make contact with the filter. The cell thus formed is short circuited by the external electric conductor 84, resulting in the anodic solution of the detached metallic zinc at the surface of the electroconducting filter. The current within the cell thus formed is controlled by placing a variable resistor 86 within the external electric conductor path. The filter is advantageously positioned adjacent the exit of the electrolyte from the battery cell. The exit stream from the battery has the lowest zinc oxide concentration during charging of the battery and therefore solubilizes any of the zinc oxide that might precipitate on the filter during discharging. The filter may be placed at other positions in the circulation system, e.g. at the exit from the storage tank, provided that both an external electric conductor and an electrolytic path are provided to a cathode of the battery.

*Example I*

A storage battery cell stack is assembled from 200 individual zinc-oxygen battery cells. Each of the individual zinc-oxygen cells is 12 inches by 12 inches and is constructed with a 0.01 inch mild steel anode backing plate upon which the zinc anode is electrodeposited to a thickness of 0.03 inch, a 0.06 inch electrolyte manifold gasket of polyethylene, a 0.02 inch porous nickel cathode, a 0.03 inch air manifold gasket of polyethylene and a 0.01 inch mild steel separator plate which also serves as the anode backing plate of the next adjacent cell, each individual cell being 0.12 inch in thickness. The zinc is deposited upon the backing plate in an amount equal to about 0.135 ounce per square inch. A porous separator of polyethylene having fluted surfaces is disposed in the electrolyte passageway within the electrolyte manifold gasket with the fluted surfaces facing toward the anode and cathode. An electroconducting fibrous filler constructed of nickel impregnated plastic fibers is placed in the space defined by the air manifold gasket. The filler in every twentieth of the individual cells is made non-electroconducting and the cathode and the anode of these cells are made extra thick with protruding fingers thereon for electrical leads. The cells are thus electrically connected together in parallel to provide 10 units of 20 individual cells each. The cells are clamped together in a plate and frame press, and the manifolding means contained within each individual cell for the passage of electrolyte and air through the cells are suitably connected to an electrolyte circulating pump and an air blower. A 20 weight percent solution of potassium hydroxide is continuously recirculated through the battery by the electrolyte pump at a rate of 0.03 cu. ft./sec.

The battery is initially constructed with a fully deposited zinc anode surface on each anode backing plate. Air is supplied to the oxygen cathodes by the air blower at a pressure of 10 p.s.i. The temperature within the battery is at about 70° C. during discharge of the battery, and the storage tank is maintained at room temperature, i.e., approximately 30° C. to 40° C.

During discharge of the battery, the no load voltage of each of the cells is 1.4 volts; the voltage at 25 milliamperes per square centimeter is 1.2 volts; and the voltage at 100 milliamperes per square centimeter is 1 volt.

The cells are preferably not discharged beyond the point where 90 percent of the zinc anode is reacted to form to zinc oxide. After 90 percent of the zinc is reacted, a decrease in the electrical characteristics of the cell stack is noted.

The battery is charged by impressing an external source of direct current which causes a current of 50 milliamperes per square centimeter to flow through the cells while passing the electrolyte through the cells. An alternating current is superimposed on the direct current to reverse the direction of current to the battery a part of each cycle of the alternating current. The battery is charged until a thickness of 0.03 inch of zinc, in the amount of about 0.135 ounce of zinc per square inch of backing plate surface area, is deposited on the surface of the anode backing plate.

The battery produces 40 kilowatt hours of electrical energy per charging cycle at a design power output of 15 kilowatts. The battery has an energy density in excess of 30 watt hours per pound and retains this energy density after repeated charging and discharging.

An alternate design of a storage battery system 100 is shown in FIGURES 4 to 8. This battery system 100 uses a cell stack 102 made up of a plurality of electrochemical cells 104 which are generally rectangular in shape and are held together in a stack by a plate and frame press (not shown). Each electrochemical cell comprises an anode support plate upon which a zinc anode is disposed, an electrolyte supply and discharge frame, and a composite integral cathode assembly.

In FIGURE 4, an electrochemical cell 104 which would be located at one end of a cell stack 102 is illustrated. The cell 104 contains a relatively heavy end plate 106 which supports the zinc anode 108 that is electroplated thereupon. A composite integral cathode assembly 110 forms the opposite end of the electrochemical cell 104, and a rectangular electrolyte supply and discharge frame 112 spaces the anode from the cathode. Interior passageways within the frame 112 provide for the supply of liquid electrolyte to the electrochemical cell and the discharge of it therefrom. A pair of gaskets 114, one on each side of the frame 112, assure that there is no leakage of fluid from the electrochemical cell 104.

The cathode assembly 110, in exploded condition, is shown in FIGURE 5 wherein it can be seen that it comprises a rectangular flat porous plate 116, made of a suitable inert material, and a thin backing plate 118 of a suitable inert material, such as mild steel. The porous plate 116 is preferably formed by pressing and sintering a suitable metal powder, such as carbonyl nickel powder, having a large surface area per unit weight. The center of the backing plate 118 is deformed to provide a generally rectangular plenum chamber 120 having dimensions slightly less than those of the porous plate 116. Additionally, a plurality of vertical ribs 122 are provided in the backing plate 118. Gas-tight connection between the backing plate 118 and the porous plate 116 is achieved in any suitable manner to provide a closed chamber therebetween, as by welding the thin backing plate to the porous plate along the periphery of the porous plate. The ribs 122 are also welded to the facing surface of the porous plate 116 thus providing good electrical connection between the overall surface of the porous plate 116 and the backing plate 118 and, in addition, preventing bowing due to the air pressure in the plenum chamber 120. The ribbed construction and the region that constitutes the plenum chamber 120 may best be seen in FIGURE 6.

The oxygen-containing gas is supplied to the plenum chamber 120 via an entrance passage at the upper right-hand corner (FIG. 5) of the composite cathode assembly 110. As best seen in FIG. 7, a short tube 124 is welded into a groove provided in the thin backing plate 118 in a location so that the lower end of the tube extends into the plenum chamber 120. The upper end of the tube 124 extends upward to a position where it is horizontally within the area of a hole 126 provided near the upper right-hand corner of the backing plate. As can be seen in FIGURE 4, this corner hole 126, in the assembled cell stack 102, is aligned with similar corner holes 128, 130 and 132 in the end plate 106, the electrolyte supply and discharge frame 112, and the gaskets 114, respectively. These aligned corner holes in the clamped-together cell stack 102 constitute the gas supply manifold through which a supply of oxygen-containing gas is fed to the plenum chambers 120 of each of the electrochemical cells 102. In this arrangement, all of the oxygen-containing gas that is supplied to the plenum chambers 120 of the individual electrochemical cells passes through the porous plates 116 and is either reacted as a part of the battery operation or is carried from the electrochemical cell via the circulating electrolyte stream.

In addition to providing one side of the plenum chamber 120 in the cathode assembly 110, the thin backing plates 118 also serve another function, that of supporting the zinc anode 108 for the next adjacent electrochemical cell. Thus, it can be seen that the bi-functional backing plates 118 serve to connect adjacent electrochemical cells together in series electrical contact by providing good electrical contact between the cathode of one cell and the anode of the next adjacent cell which is plated on the backing plate itself.

The electrolyte supply and discharge frame 112, which is made of a suitable material which is inert to the caustic electrolyte, such as polyethylene or polypropylene, contains a horizontal slot 134 and a horizontal slot 136 formed, respectively, in its upper and lower legs. The slot 136 is connected via a plurality of weep notches or holes 138 to the rectangular region 140 interior of this frame which serves as the electrolyte passageway for each individual cell 104. A like connection is provided between the interior region 138 and the upper slot 134 via weep notches or holes 142. An electrolyte supply tube 144 is connected to the lower slot 136, as by entering through the bottom face of the frame 112. An electrolyte discharge tube 146 is likewise connected, through the upper face of the frame 112, to the upper slot 134. As seen in FIG. 4, during operation each of the electrochemical cells 104 is constantly supplied with caustic electrolyte which enters through the tube 144, the elongated slot 136 and the weep holes 138 and exits from the upper portion of the cell through the weep holes 142, the elongated slot 134, and the discharge tube 146.

Preferably, a parallel flow of electrolyte is established through each of the electrochemical cells 104 in the cell stack 102. Accordingly, all of the electrolyte supply tubes 144 lead from a common conduit 148, shown in FIG. 8 as conduit 148, and all of the discharge tubes 146 likewise merge into a common conduit 150. To reduce the self-discharge of the series-connected electrochemical cells to an acceptably low level, the supply and discharge tubes 144 and 146 are made long enough to desirably lengthen the electrolytic path between adjacent cells via the electrolyte system. If it is desired to reduce resistance to flow of the electrolyte through the cell stack 102, more than one supply and discharge tube may be provided for each electrochemical cell 104.

In the diagrammatic view shown in FIG. 8, a 15-cell stack is illustrated which utilizes air as the oxygen-containing gas and an aqueous solution of potassium hydroxide as the electrolyte. An air compressor 152 supplies air from the atmosphere to each of the electrochemical cells 104 at a sufficient pressure so that air bubbles through the porous plates and into the electrolyte passageway in each cell. The electrolyte stream which exits from the 15-cell stack through the conduit 150 passes through a radiator means 154 which cools the electrolyte to remove most of the heat which is generated within the cell stack 102 as a part of the electrochemical operation. Next, the circulating discharge electrolyte stream passes into a gas-liquid separator 156 wherein separation of the nitrogen and unreacted oxygen of the air from the liquid electrolyte is accomplished. The separated gases are vented to the atmosphere, and the electrolyte is passed into a storage sump 158.

A pump 160 withdraws electrolyte from the sump 158 and continuously recirculates it through the 15-cell stack via the conduit 148. An outlet conduit 162 from the pump 160 branches into the conduit 148 which re-enters the cell stack 102 and the smaller conduit 164 which carries about 5% of the volume of the flow from the pump 160 to a zinc oxide separation and storage means 166. Any suitable means, such as those enumerated elsewhere in the application, may be employed which will separate the zinc oxide (which may be partially in the form of a zinc hydroxy complex) from the electrolyte and retain the zinc oxide. The electrolyte, depleted of most of the zinc oxide it carried, is returned to the sump 158. This continuous separation of zinc oxide from a portion of the electrolyte stream maintains the concentration of the zinc oxide reaction products in the electrolyte being recirculated to the cell stack at a sufficiently low level that it can adequately continue to remove the reaction products constantly being created in each cell. Of course, dependent upon the total volume of electrolyte used, the rate of flow of the electrolyte through the electrochemical cells, and the operating conditions of the cell stack 102, it may be desirable to divert a greater or a lesser percentage of the electrolyte stream for separation of reaction products.

During recharging, as in any storage or secondary battery, the direction of current flow is reversed (from that during discharge), and a voltage equal to about 2 volts for each of the electrochemical cells 104 in series connection is used for this purpose. During recharging, the electrolyte is circulated and recirculated through the cell stack 102 at about the same rate employed during discharge. The electrochemical reaction during recharging causes metallic zinc to be plated out on the end plate 106 and the backing plates 118, simultaneously depleting the zinc oxide content of the electrolyte stream. However, diversion of about the same portion of the electrolyte stream through the zinc oxide storage means 166 permits the depleted electrolyte to pick up additional zinc oxide so that there is always sufficient zinc oxide available in the electrolyte in the electrochemical cells to permit the rebuilding of the zinc anodes to be carried out at the desired rate. Of course, during recharging, it is not necessary to operate the air compressor because there is no need to supply oxygen; on the contrary, during the recharging of the cells oxygen is evolved from the surface of the porous electrode. This evolved oxygen is carried from the cell stack 102 by the circulating electrolyte stream and is separated from the liquid electrolyte in the gas-liquid separator 156.

*Example II*

A storage battery system 100 is assembled using 60 individual zinc-oxygen electrochemical cells 104 which are connected in series electrical connection into four separate 15-cell stacks. These four separate cell stacks 102 are connected in parallel electrical connection.

Each of the individual zinc-oxygen cells is about 16" wide x 8" high and has a composite thickness of slightly over ¼". The composite integral cathode assembly 110 for each electrochemical cell 104 includes a porous plate 116 made of sintered carbonyl nickel powder, which plate is about 15¾" wide x 7¾" high x 0.04" thick. This porous plate is welded along its periphery to a thin backing plate 118 of 0.005" mild steel, which plate has deformed therein a plenum chamber 120 about 0.02" thick (see FIG. 6). A short tube 124 of 0.03" internal diameter is welded at the upper right-hand corner to serve as the entrance conduit to the plenum chamber 120.

The electrolyte supply and discharge frame 112 is injection-molded from polypropylene and is about ¼" thick and formed with the internal slots 134 and 136 and notches 138 and 142 that provide inlets and outlets for electrolyte to the interior region 140 thereof. Each of the electrolyte frames 112 is provided with four supply tubes 144 and four discharge tubes 146 of 3/16" diameter. Each of these tubes is about 15" long from the point where it enters the frame 112 to the point where it emerges into the common electrolyte conduit.

Metallic zinc is electroplated onto the exposed face of the backing plates 118 over an area approximately equal to the area of the porous plate 116. The electroplating of the zinc is carried out under conditions so as to deposit about 0.135 ounce of zinc per square inch of surface of the backing plate. A 20 weight percent solution of potassium hydroxide is continuously recirculated through the four cell stacks 102 by a pump 160 at the rate of about 0.48 cubic feet per second (for the full storage battery of 60 electrochemical cells connected in hydraulic parallel connection).

During discharge, air is supplied to the plenum chambers 120 by the air compressor 152 at about 15 p.s.i.g. and at a rate of about 0.17 cubic feet per second for the total battery. The temperature within the individual cell stacks is maintained at about 70° C. during the discharge of the battery via the dissipation of heat from the electrolyte stream by means of the radiator 154. A self-cleaning filter is employed in combination with the zinc oxide storage tank to accomplish the desired separation and storage. About 0.02 cubic feet per second of electrolyte is passed through the separation and storage means 166 during operation of the battery system. The temperature exterior of the zinc oxide storage tank approaches ambient temperature. The temperature of the electrolyte storage sump 158 is about cell temperature, i.e., about 70° C.

During discharge of the battery, the no load voltage of each of the cells measures about 1.4 volts. At about 25 ma./sq. cm. the voltage is about 1.2 volts, and at 100 ma./sq. cm. the voltage is about one volt.

The electrochemical cells are preferably not discharged beyond reaction of about 90% of the metallic zinc. The 60-cell battery produces about 25 kilowatt hours of electrical energy per charging cycle, at a design power output of about 5 kilowatts. The battery has an energy density in excess of about 30 watt hours per pound and retains the energy density after repeated charge and discharge cycles.

The battery is charged by applying a voltage of about 30 volts with sufficient amperage to cause a current of about 50 ma./sq. cm. to flow through the cells. During charging, the circulation of electrolyte is maintained at about 0.48 cubic feet per second. Preferably, alternating current superimposed upon a direct current is employed during the charging of the battery. The charging is carried out until the zinc anodes have been rebuilt to an amount of about 0.135 ounce per square inch of surface area.

The battery system is considered to be well suited for applications of motive or traction power wherein power is supplied for a substantial portion of a day, and then recharging of the battery is carried out during off-hours so that the battery system is recharged and ready for operation by working time of the following day.

Other means besides those specifically described are contemplated for circulating the electrolyte and air through the battery cell, and it is not intended to limit the scope of the invention to the specific means disclosed. Additionally, it is obvious that other methods, such as a periodically scraped filter, may be employed to remove the zinc oxide from the electrolyte externally of the battery cell, and there has not been an attempt to set forth all the methods of accomplishing the removal of zinc oxide.

It is also possible to employ an external cooling unit in place of a heat exchanger for cooling the electrolyte. Furthermore, the battery can be constructed in other shapes than those described for instance a cylindrical shape could be employed. Similarly, the arrangement of adjacent cells can be modified, for instance in such a way that each gas passage supplies oxygen-containing gas to two cathodes which form its walls, and each anode backing plate has zinc deposited on either side.

It can be seen that a zinc-oxygen storage battery has been provided which has a high energy density. The battery is particularly adaptable for use as a motive power source for traction purposes, and for other purposes, where space and weight limitations restrict the use of conventional storage batteries. Additionally, the battery is convenient to use, provides trouble free operation and requires infrequent recharging.

Various of the features of the invention are set forth in the following claims.

What is claimed is:

1. In a rechargeable energy conversion system, at least one electrochemical rechargeable cell having a zinc electrode and an inert porous electrode which is spaced from said zinc electrode to define an electrolyte passageway therebetween for a liquid electrolyte, means for supplying an oxygen-containing gas to said porous electrode, means for circulating liquid electrolyte through said electrolyte passageway and for recirculating the electrolyte exiting from said electro-chemical cell back to said cell, and means for separating the reaction products which are formed during cell discharge from said electrolyte and for storing said separated reaction products exterior of said electrochemical cell, whereby said reaction products are available where they may be carried back into said electrochemical cell during recharging thereof and be plated upon said zinc electrode as metallic zinc.

2. The invention set forth in claim 1 wherein said gas supply means provides air from the atmosphere.

3. The invention set forth in claim 1 wherein said porous electrode is a flat porous metallic plate.

4. The invention set forth in claim 3 wherein said zinc electrode includes an inert thin electroconductive supporting plate.

5. The invention set forth in claim 4 wherein a plurality of electrochemical cells are provided and wherein said inert thin plate is electrically connected to the porous cathode of the next adjacent electrochemical cell and also at least partially defines a plenum chamber through which oxygen-containing gas is supplied to said porous electrode.

6. The invention set forth in claim 5 wherein said inert thin plate is deformed to partially define said plenum chamber and is electrically and structurally connected to said porous plates about the periphery of said deformation to provide said plenum chamber therebetween.

7. The invention set forth in claim 4 wherein a frame member spaces apart said electrodes of said cell, which frame member contains internal pasageways for the supply and discharge of electrolyte from said cell.

8. The invention set forth in claim 2 wherein said gas supply means operates at sufficient pressure to force air through said porous electrode and bubble it into said liquid electrolyte and wherein means are provided for separating the unreacted portions of said air from the electroylte after the electrolyte exists from said cell and before it is recirculated thereto.

9. The invention set forth in claim 1 wherein means are provided for cooling the electrolyte after it exists from said cell and before it reaches said reaction products separation and storage means.

10. The invention set forth in claim 1 wherein said reaction products separation and storage means contains a mass of fibrous material.

11. The invention set forth in claim 1 wherein said reaction products separation and storage means contains a periodically scraped filter.

12. In a rechargeable energy conversion system, a plurality of electromechanical rechargeable cells each of which comprises a first backing plate of electroconductive material, a deposit of zinc on said first backing plate constituting a flat anode, a flat porous plate made of an electroconductive material that is chemically inert to the electrolyte used and that serves as a cathode, a second backing plate of electroconductive material generally spaced from the rear surface of said porous plate which together with the rear surface of said porous plate defines a gas plenum chamber therebetween, a peripheral frame gasket member disposed between adjacent backing plates generally adjacent the peripheries thereof and generally defining the perimeter of an electro chemical cell and uniformly spacing the front surface of said porous plate from said flat anode to define an electrolyte passageway therebetween, said porous plate being electrically connected to said second backing plate, the first backing plate of one of said cells serving as the second backing plate of an adjacent cell and the second backing plate of said one cell serving as the first backing plate of an adjacent cell whereby said one cell is in series electrical connection with said two adjacent cells, means for supplying air through said gaskets to each of said plenum chambers at sufficient pressure so that air passes through said porous plates whereby zinc oxide reaction products are formed in the electrolyte in said cells during electrochemical discharge of the battery, a substantially closed circuit means for circulating an aqueous caustic electrolyte in parallel flow through each of said cells and for recirculating the electrolyte exiting from said cells back to said cells, means for separating unreacted portions of the air from the electrolyte after it exits from said cells and before its recirculation thereto, and means for separating the zinc oxide reaction products which are formed during battery discharge from said electrolyte and storing said separated reaction products exterior of said electrochemical cells, whereby said reaction products are available where they may be carried back into said electrochemical cells during recharging of the battery and be plated upon said zinc electrodes as metallic zinc.

13. The invention set forth in claim 6 wherein said zinc electrode material is physically supported by attachment to said inert thin plate.

14. The invention set forth in claim 1 wherein only a portion of the electrolyte exiting from said cell passes through said reaction products separation means before being recirculated back to said cell.

References Cited

UNITED STATES PATENTS

| | | | |
|---|---|---|---|
| 2,870,235 | 1/1959 | Soltis | 135—111 |
| 2,925,455 | 2/1960 | Eidensohn et al. | 136—86 |
| 3,077,507 | 2/1963 | Kordesch et al. | 136—86 |
| 3,161,546 | 12/1964 | Yeager et al. | 136—86 |
| 3,172,784 | 3/1965 | Blackmer | 135—86 |

WINSTON A. DOUGLAS, *Primary Examiner.*

B. J. OHLENDORF, A. SKAPARS, *Examiners.*

UNITED STATES PATENT OFFICE
CERTIFICATE OF CORRECTION

Patent No. 3,359,136                                December 19, 1967

Ulrich Merten et al.

It is hereby certified that error appears in the above numbered patent requiring correction and that the said Letters Patent should read as corrected below.

Column 8, line 38, before "slot 136" insert -- lower --; column 12, line 11, for "electromechanical" read -- electrochemical --.

Signed and sealed this 25th day of February 1969.

(SEAL)
Attest:

Edward M. Fletcher, Jr.                              EDWARD J. BRENNER
Attesting Officer                                         Commissioner of Patents